United States Patent
Karikari et al.

(10) Patent No.: US 9,969,904 B2
(45) Date of Patent: May 15, 2018

(54) EPOXY-FORTIFIED FLOOR POLISHES

(71) Applicants: Rohm and Haas Company, Philadelphia, PA (US); Dow Global Technologies LLC, Midland, MI (US)

(72) Inventors: Afua Sarpong Karikari, Bristol, PA (US); Paul Mercando, Pennsburg, PA (US); Theodore Tysak, Ambler, PA (US); Caroline Woelfle-Gupta, Midland, MI (US)

(73) Assignees: ROHM AND HAAS COMPANY, Philadelphia, PA (US); DOW GLOBAL TECHNOLOGIES LLC, Midland, MI (US)

( * ) Notice: Subject to any disclaimer, the term of this patent is extended or adjusted under 35 U.S.C. 154(b) by 0 days. days.

(21) Appl. No.: 15/124,733

(22) PCT Filed: Mar. 16, 2015

(86) PCT No.: PCT/US2015/020681
§ 371 (c)(1),
(2) Date: Sep. 9, 2016

(87) PCT Pub. No.: WO2015/148163
PCT Pub. Date: Oct. 1, 2015

(65) Prior Publication Data
US 2017/0015869 A1 Jan. 19, 2017

Related U.S. Application Data

(60) Provisional application No. 61/969,374, filed on Mar. 24, 2014.

(51) Int. Cl.
C09G 1/16 (2006.01)
C09G 1/04 (2006.01)
C08L 63/00 (2006.01)
C08L 33/00 (2006.01)

(52) U.S. Cl.
CPC ........ C09G 1/16 (2013.01); C09G 1/04 (2013.01)

(58) Field of Classification Search
None
See application file for complete search history.

(56) References Cited

U.S. PATENT DOCUMENTS

| | | |
|---|---|---|
| 6,875,834 B2 | 4/2005 | Gray et al. |
| 2002/0183455 A1 | 12/2002 | Gray et al. |
| 2004/0138328 A1 | 7/2004 | Kohr et al. |
| 2007/0254108 A1 | 11/2007 | Schopke et al. |
| 2008/0249207 A1 | 10/2008 | Whiteley et al. |
| 2011/0118409 A1 | 5/2011 | Eichman et al. |
| 2012/0301621 A1 | 11/2012 | Dombrowski et al. |

FOREIGN PATENT DOCUMENTS

| | | | |
|---|---|---|---|
| EP | 2495281 A1 | 9/2012 | |
| JP | 2000086977 A | 3/2000 | |
| JP | 2000212502 A | * 8/2000 | |

* cited by examiner

*Primary Examiner* — Randy P Gulakowski
*Assistant Examiner* — Ha S Nguyen
(74) *Attorney, Agent, or Firm* — Kenneth Crimaldi

(57) ABSTRACT

An aqueous composition comprising: (a) an aromatic-acrylic polymer comprising from 3 to 11 wt % polymerized units of $C_3$-$C_6$ carboxylic acid monomers and from 0.2 to 3 wt % polymerized units of anti-agglomerating monomers; (b) a reactive polyfunctional thermosetting resin; (c) a polyvalent metal ion; and (d) a polyfunctional curing agent, wherein the curing agent is stored separately from the thermosetting resin.

12 Claims, No Drawings

EPOXY-FORTIFIED FLOOR POLISHES

This invention relates to an aqueous coating composition particularly useful as a floor finish.

Aqueous coating compositions based on acrylic polymers and used on floors and other surfaces have traditionally used transition metal ions, e.g., zinc, to add in crosslinking. Use of an epoxy resin as an additional component is disclosed in JP2000086977, which relies on acidic functionality in the acrylic polymer to cure the epoxy resin. However, the prior art does not address the problem of obtaining floor polishes with improved durability.

The problem addressed by the present invention is to provide an improved aqueous coating composition capable of producing a floor finish with improved durability.

STATEMENT OF INVENTION

The present invention provides an aqueous composition comprising: (a) an aromatic-acrylic polymer comprising from 3 to 11 wt % polymerized units of $C_3$-$C_6$ carboxylic acid monomers and from 0.2 to 3 wt % polymerized units of anti-agglomerating monomers; (b) a reactive polyfunctional thermosetting resin; (c) a polyvalent metal ion; and (d) a polyfunctional curing agent, wherein the curing agent is stored separately from the thermosetting resin.

The present invention is further directed to a method for coating a substrate. The method comprises applying an aqueous composition formed by combining ingredients comprising: (a) an aromatic-acrylic polymer comprising from 3 to 11 wt % polymerized units of $C_3$-$C_6$ carboxylic acid monomers and from 0.2 to 3 wt % polymerized units of anti-agglomerating monomers; (b) a reactive polyfunctional thermosetting resin; (c) a polyvalent metal ion; and (d) a polyfunctional curing agent.

DETAILED DESCRIPTION

Percentages are weight percentages (wt %), temperatures are in ° C. and results were obtained at room temperature (20-25° C.), unless specified otherwise. Weight percentages of monomers are based on the total weight of monomers in the polymerization mixture. Percentages listed with certain formulation ingredients are the percent solids of the aqueous emulsion or dispersion as obtained commercially.

As used herein the term "(meth)acrylic" refers to acrylic and/or methacrylic, and "(meth)acrylate" refers to acrylate and/or methacrylate. The term "(meth)acrylamide" refers to acrylamide (AM) and/or methacrylamide (MAM). "Acrylic monomers" include acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), isobutyl methacrylate (iBMA), hydroxyethyl methacrylate (HEMA), hydroxyethyl acrylate (HEA), methyl acrylate (MA), ethyl acrylate (EA), butyl acrylate (BA), ethylhexyl acrylate (EHA) and phosphoethylmethacrylate (PEM). The term "vinyl monomers" refers to monomers that contain a carbon-carbon double bond that is connected to a heteroatom such as nitrogen or oxygen. Examples of vinyl monomers include, but are not limited to, vinyl acetate, vinyl formamide, vinyl acetamide, vinyl pyrolidone, vinyl caprolactam, and long chain vinyl alkanoates such as vinyl neodecanoate, and vinyl stearate. The term "aromatic-acrylic polymers" refers to polymers which have at least 50% acrylic monomers and vinyl aromatic monomers or vinyl cyclohexyl monomers, preferably at least 75%, preferably at least 85%, preferably at least 95%. Vinyl aromatic monomers have one ethylenically unsaturated group per molecule. Examples of vinyl aromatic monomers include 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, 1-vinylnapthalene, cyclohexyl methacrylate, benzyl methacrylate and benzyl acrylate. Preferred vinyl aromatic monomers include vinylpyridines, styrene (Sty) and 4-methylstyrene (vinyltoluene). The term "styrene-acrylic polymers" refers to polymers of acrylic monomers and copolymers comprising at least 50% of acrylic monomers, styrene and vinyltoluene. Preferably, styrene-acrylic polymers have at least 75% of monomer residues derived from (meth)acrylic acids, (meth)acrylates or styrene, more preferably at least 85%, and most preferably at least 95%. Preferably, any remaining monomer units are derived from vinyl monomers.

For purposes of this invention, aliphatic compounds are compounds containing no aromatic rings, i.e., they may include both straight or branched chains and non-aromatic rings. Alkyl groups are straight or branched chain hydrocarbon groups.

A "polyfunctional thermosetting resin" is a material that cures by formation of covalent bonds into a thermoset polymer. Preferred polyfunctional thermosetting resins are epoxy resins. Preferably, the epoxy resin is a condensate of epichlorohydrin and a diol. Preferably, the epoxy resin is an aromatic epoxy resin, preferably a bisphenol A resin or a novolac epoxy resin, preferably a bisphenol A resin. Preferably, the epoxy resin is a condensate of an aromatic diol (e.g., bisphenol A) and epichlorohydrin. Preferably, the molecular weight of the epoxy resin is no greater than 1000, preferably no greater than 800, preferably no greater than 600, preferably no greater than 400.

Preferably, when the polyfunctional thermosetting resin is an epoxy resin, an amine hardener is used to cure the resin. Aliphatic, cycloaliphatic and aromatic amines are all employed as epoxy hardeners. Preferred amine hardeners include, e.g., aliphatic polyamines having from four to ten carbon atoms and from two to five amino groups (such as triethylene tetramine, diethylene triamine); cycloaliphatic amines having from six to fifteen carbon atoms and from two to four amino groups, preferably two amino groups (such as diaminocyclohexanes, isophorone diamine, diaminodicyclohexymethanes); and aromatic polyamines having from six to ten carbon atoms and from two to four amino groups, preferably two amino groups (such as toluenediamines, xylenediamines). Preferred hardeners include, e.g., diethylenetriamine, triethylenetetramine, tetraethylene-pentamine, 2,2,4-trimethylhexamethylenediamine, 2,4,4-trimethylhexamethylenediamine, 1,6-hexanediamine, 1-ethyl-1,3-propanediamine, bis(3-aminopropyl)piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norbornanediamine, 4,4'-diaminodicyclohexylmethane, 4,4'-diaminodicyclohexylmethane, 4,4'-diaminodicyclohexyl-propane, 2,2-bis(4-aminocyclohexyl)propane, 3,3'-dimethyl-4,4'-diaminodicyclohexylmethane, 3-amino-1-cyclohexane-amino-propane, 1,3- and 1,4-bis (aminomethyl)cyclohexane, m-xylylenediamine, p-xylylenediamine, polyoxypropylenediamines, polyamidoamines, and aminoplast resins formed by the reaction of ureas and melamines with aldehydes.

Preferably, the aqueous composition of this invention is applied to a substrate within 24 hours of blending all components, preferably within 16 hours, preferably within 8 hours. Preferably, the composition is applied to the substrate at least 2 hours after formation, preferably at least 1 hour, preferably at least 0.5 hours.

Crosslinkers are monomers having two or more ethylenically unsaturated groups, and may include, e.g., divinylaromatic compounds, di-, tri- and tetra-(meth)acrylate esters, di-, tri- and tetra-allyl ether or ester compounds and allyl (meth)acrylate. Preferred examples of such monomers include divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Especially preferred crosslinkers include DVB, ALMA, EGDMA, HDDA and BGDMA; preferably ALMA. In one preferred embodiment, the amount of polymerized crosslinker units in the aromatic-acrylic polymer is at least 0.05%, preferably at least 0.07%, preferably at least 0.09%, preferably at least 0.11%, preferably at least 0.13%. Preferably, the amount of crosslinker residue in the polymer is no more than 2%, preferably no more than 1.5%, preferably no more than 1.2%, preferably no more than 1%, preferably no more than 0.8%, preferably no more than 0.6%, preferably no more than 0.5%. If a crosslinker is present, preferably the molecular weight of the crosslinker is from 180 to 330, alternatively from 200 to 300. Preferably, the crosslinker is diethylenically unsaturated, e.g., DVB, ALMA or di(meth)acrylate esters of diols. Preferably, the crosslinker is a diethylenically unsaturated crosslinker with molecular weight from 100 to 250, alternatively from 110 to 230, alternatively from 110 to 200, alternatively from 115 to 160.

Preferably, the polymer is not a multistage polymer. In one preferred embodiment, the polymer comprises from 25 to 50 wt % polymerized units of at least one vinyl aromatic monomer. Preferably, the polymer comprises at least 28% polymerized units of at least one vinyl aromatic monomer, preferably at least 30%, preferably at least 32%; preferably, the polymer comprises no more than 45% polymerized units of at least one vinyl aromatic monomer, preferably no more than 42%, alternatively no more than 40%, preferably no more than 38%. Preferably, the vinyl aromatic monomer is styrene. Preferably, the polymer comprises from 48 to 74 wt % polymerized residues of acrylic monomers; preferably at least 54 wt %, preferably at least 56 wt %; preferably no more than 71 wt %, preferably no more than 69 wt %. In one preferred embodiment, the polymer comprises no more than 25% polymerized units of vinyl aromatic monomer, preferably no more than 20%, preferably no more than 15%, preferably no more than 10%, preferably no more than 5%.

Preferably, the polymer further comprises polymerized monomer units of $C_1$-$C_8$ alkyl (meth)acrylate(s). Preferably, the $C_1$-$C_8$ alkyl (meth)acrylate(s) comprise an alkyl methacrylate and an alkyl acrylate, preferably a $C_1$-$C_2$ alkyl methacrylate (MMA or EMA) and a $C_4$-$C_8$ alkyl acrylate (e.g., BA or EHA), preferably MMA and a $C_4$-$C_8$ alkyl acrylate, preferably MMA and BA. Preferably the total amount of $C_1$-$C_8$ alkyl (meth)acrylate monomer units is from 40% to 95%. Preferably, the total amount of $C_1$-$C_8$ alkyl (meth)acrylate monomer units is at least 50%, preferably at least 60%, preferably at least 65%, preferably at least 70%, preferably at least 75%, preferably at least 80%, preferably at least 85%. Preferably, the total amount of $C_1$-$C_8$ alkyl (meth)acrylate monomer units is no greater than 94%, preferably no greater than 93%, preferably no greater than 92%. Preferably, the polymer comprises from 40% to 80% polymerized units of an alkyl methacrylate, preferably MMA or EMA, preferably MMA; preferably at least 45%, preferably at least 50%, preferably at least 55%, preferably at least 58%; preferably no more than 75%, preferably no more than 72%, preferably no more than 70%.

Preferred $C_3$-$C_6$ carboxylic acid monomers include, e.g., acrylic acid, methacrylic acid, crotonic acid, itaconic acid, maleic acid and fumaric acid. Preferably, the $C_3$-$C_6$ carboxylic acid monomers are acrylic acid and/or methacrylic acid, preferably methacrylic acid. Preferably, the polymer contains at least 3.5% polymerized units of $C_3$-$C_6$ carboxylic acid monomers, preferably at least 4%, preferably at least 4.5%; preferably no more than 10%, preferably no more than 9%, preferably no more than 8%, preferably no more than 7%, preferably no more than 6.5%, preferably no more than 6%. Preferably, the polymer contains at least 4% polymerized units of methacrylic acid, preferably at least 4.3%, preferably at least 4.5%; preferably no more than 9%, preferably no more than 8%, preferably no more than 7%, preferably no more than 6%, preferably no more than 5.5%.

Anti-agglomerating functional groups can be incorporated into the polymer particles using monomers containing anti-agglomerating functional groups (anti-agglomerating monomers), although it would also be possible to incorporate such groups by grafting. The anti-agglomerating groups are believed to be effective because they are hydrophilic as well as non-reactive with oxirane groups under heat-age conditions. The general class of such groups includes amide groups, acetoacetoxy groups, and strong protic acids, which are pH adjusted to form their conjugate bases. Preferred anti-agglomerating monomers include, e.g., acrylamide, phosphoethyl methacrylate, sodium styrene sulfonate, acetoacetoxyethyl methacrylate, and acrylamido-methylpropane sulfonate; preferably phosphoethyl methacrylate.

Preferably, the pH of the aqueous composition is from 2 to 7, preferably from 4 to 6, preferably about 5.

Preferably, the aqueous coating composition comprises from 5% to 15% of the aromatic-acrylic polymer, preferably at least 6%, preferably at least 7%, preferably at least 7.5%, preferably at least 8%, preferably at least 8.5%; preferably no more than 13%, preferably no more than 12%, preferably no more than 11%, preferably no more than 10%, preferably no more than 9.5%. Percentages are calculated based on solids weight of the polymer (i.e., the polymer itself) and the entire weight of the coating composition, including water. More than one polymer according to this invention may be present, with the total amount of polymers being within the amounts specified above.

Preferably, the aqueous coating composition comprises from 1% to 7% of the reactive polyfunctional thermosetting resin, preferably at least 1.5%, preferably at least 2%, preferably at least 2.5%, preferably at least 3%; preferably no more than 6%, preferably no more than 5%, preferably no more than 4%. Percentages are calculated based on solids weight of the resin and the entire weight of the coating composition, including water. More than one polyfunctional thermosetting resin according to this invention may be present, with the total amount of resin(s) being within the amounts specified above. Preferably, the polyvalent metal ion is zinc, calcium, magnesium, zirconium, aluminum, nickel, iron, and copper, preferably zinc. Preferably, the polyvalent metal ion is present in the composition in an amount from 0.01% to 3.0%; preferably at least 0.05%, preferably at least 0.1%, preferably at least 0.3%, preferably at least 0.5%; preferably no more than 2.5%, preferably no more than 2%. The polyvalent metal cross-linker can be added to the polymer during the emulsion synthesis. More preferably, the polyvalent metal is added during the finish formulation process.

Preferably, the aromatic-acrylic polymers used in this invention are prepared by copolymerizing the monomers using well known emulsion polymerization processes, and any other suitable processes known in the art, using, for example, a free-radical initiator such as peroxygen compounds or diazo compounds and, optionally, chain transfer agents. For example, the process described in U.S. Pat. No. 5,574,090, with addition of chain transfer agent, is suitable. The length of the primary polymer chains is typically such that, if any crosslinks were removed, the molecular weight ($M_w$) would be at least 40,000, preferably at least 60,000, preferably at least 80,000, preferably at least 100,000, preferably at least 200,000, preferably at least 250,000; preferably no more than 1,000,000, preferably no more than 700,000, preferably no more than 500,000, preferably no more than 300,000.

Preferably, the aqueous coating composition has at least 42% water, alternatively at least 44%, alternatively at least 46%, alternatively at least 48%, alternatively at least 50%. Preferably, the aqueous composition contains no more than 10% organic solvent, alternatively no more than 8%, alternatively no more than 6%. In some embodiments, the composition contains at least 2% organic solvent, alternatively at least 4%, alternatively at least 4.5%. Preferred organic solvents include, e.g., aliphatic glycol ethers and esters; preferably methyl or ethyl mono-ethers of diethylene glycol or dipropylene glycol and 2,2,4-trimethyl-1,3-pentanediol monoisobutyrate.

The average particle diameter of the emulsion polymer particles is typically from 40 nanometers to 1000 nanometers, preferably from 40 nanometers to 300 nanometers. Particle sizes herein were those measured by dynamic light scattering on a Brookhaven BI-90 analyzer. Latex samples were diluted to the appropriate concentration with 1N KCl (aq).

The floor coating composition of the present invention optionally may include other ingredients, e.g., waxes, alkali-soluble resins, plasticizers, coalescents, wetting aids, defoamers, soluble or dispersed biocides, polyurethane dispersions, silicates, etc. The alkali-soluble resins of this invention are in the range of 0% to 10%, more preferably 2% to 7%, based on polymer solids. The waxes are used in a range of 2% to 10%, more preferable 2.5% to 6%, based on wax solids. Preferably, the total amount of coalescent, leveling agent and plasticizer in the aqueous composition is no more than 20 wt %, preferably no more than 15 wt %, preferably no more than 13 wt %; preferably at least 5 wt %, preferably at least 7 wt %. Coalescents and plasticizers are typically organic solvents.

In the method of this invention, the aqueous composition is applied to a surface, e.g., floors, walls, counter tops, roofs, etc., preferably at a temperature from 15 to 35° C. Materials to which the composition may be applied include stone, concrete, asphalt, roofing substrates, linoleum, tile, wood, particle or fiber board, glass, leather, paper and cardboard. Preferably, the composition is applied to floors. Preferably, the composition is cured under ambient conditions without external heating, ventilation or humidity control, although these may be used as needed.

EXAMPLES

TABLE 1

| Abbreviations | |
| --- | --- |
| BA | Butyl acrylate |
| MMA | Methyl methacrylate |
| MAA | Methacrylic acid |
| STY | Styrene |
| Bisphenol A diglycidyl ether | D.E.R ™ 331 Liquid Epoxy Resin |
| PEM | Phosphoethylmethacrylate |

Example 1: Preparation of Intermediate Aqueous Emulsion Polymer

The abbreviations used in these samples are listed in Table 1 and are to be understood as having the meaning set forth in the glossary. All percentages are percent by weight unless otherwise specified. Table 2 list the polymerization recipe.

In a suitable reaction vessel equipped with a thermometer, condenser, and stirrer, the initial reactor charge was heated to 89° C. under a nitrogen blanket while Feeds A, B, C, D, E, F, and G were being prepared. At 89° C., Feed C (Kettle Catalyst) and Feed D (Kettle buffer) was added all at once to the reaction vessel. Feed B (Preform Seed) and rinse were then added to the reactor. Feed A, and a cofeed catalyst solution Feed E were gradually added to the reaction vessel at half rate for 10 minutes. After 10 minutes, the feed rates were increase to full rate for 80 minutes at 86° C. After Feeds A and E were complete, the kettle was held at 86° C. for 15 minutes. Feed F (Chase buffer) was then fed to the reactor over 5 minutes followed by a 5 minute hold. At approximately 80° C., Feed G (Chase promoter) and Feed H (Chase catalyst) were added to the reactor. Feed I (activator) was then added gradually to the reactor contents over 15 minutes while cooling to 70° C. At 65° C., Feeds J and K (chase 2) were added all at once to the reactor, followed by a 15 minute hold. After the hold, the reactor was slowly cooled to 40° C. At 40° C., Feed L (Biocide) was added over 5 minutes and the resulting latex emulsion was subsequently cooled to room temperature.

TABLE 2

| Materials for Intermediate Aqueous Emulsion Polymer | |
| --- | --- |
| INGREDIENT | AMOUNT (g) |
| REACTOR CHARGE | Amount (g) |
| D.I. WATER | 628.4 |
| FEED A | |
| D.I. WATER | 445.9 |
| DISPONIL FES 32 (31%) | 36.3 |
| BA | 396.0 |
| MMA | 984.0 |
| MAA | 72.0 |
| PEM | 48.0 |
| D.I. WATER (Rinse) | 32.4 |
| FEED B | |
| E-2439 (34.00%) | 42.0 |
| D.I. WATER (Rinse) | 16.2 |

TABLE 2-continued

Materials for Intermediate Aqueous Emulsion Polymer

| INGREDIENT | AMOUNT (g) |
|---|---|
| FEED C | |
| APS | 4.7 |
| D.I. WATER | 32.4 |
| D.I. WATER (Rinse) | 8.1 |
| FEED D | |
| Na$_2$CO$_3$ | 0.1 |
| D.I. WATER | 3.7 |
| D.I. WATER (Rinse) | 3.7 |
| FEED E | |
| APS | 2.0 |
| D.I. WATER | 73.0 |
| D.I. WATER (Rinse) | 4.1 |
| FEED F | |
| AQ. AMMONIA (29.0%) | 20.6 |
| D.I. WATER | 8.1 |
| D.I. WATER (Rinse) | 4.10 |
| FEED G | |
| FeSO$_4$•7H$_2$O (0.15%) | 10 |
| VERSENE | 1.5 |
| FEED H | |
| TBHP (70%) | 1.05 |
| D.I. WATER | 12.2 |
| D.I. WATER (Rinse) | 4.10 |
| FEED I | |
| IAA | 0.73 |
| D.I. WATER | 16.2 |
| D.I. WATER (Rinse) | 4.10 |
| FEED J | |
| TBHP (70%) | 0.65 |
| D.I. WATER | 8.1 |
| D.I. WATER (Rinse) | 4.1 |
| FEED K | |
| IAA | 0.45 |
| D.I. WATER | 8.1 |
| D.I. WATER (Rinse) | 4.10 |
| FEED L | |
| KATHON LX (1.5%) | 6.2 |
| D.I. WATER | 18.8 |
| D.I. WATER (Rinse) | 4.1 |

Example 2

The acrylic epoxy dispersion of Example 2 contains the noted charged amounts: 70 wt % of the acrylic latex in Example 1 and 30 wt % of Bisphenol A diglycidyl ether liquid epoxy, D.E.R.™ 331 Liquid Epoxy Resin. In a suitable reaction vessel equipped with a thermometer, condenser, and stirrer, 804 g aliquot of intermediate polymer A was heated to 60° C. under a nitrogen blanket. In a separate container, D.E.R.™ 331 Liquid Epoxy Resin [supplied by the Dow Chemical Company, Midland, Mich., U.S.A.] (180 g), deionized water (189.7 g), and TRITON™ X-405 (26.0 g) were pre-mixed and homogenized for 10 seconds using a digital homogenizer (5000 rpm, IKA T25 Ultra Turrax homogenizer). The emulsified D.E.R.™ 331 Liquid Epoxy Resin mixture was then added to the latex emulsion of Example 1 over several minutes using a funnel while cooling to 50° C. The mixture was held at 50° C. while stirring for 1 hr. After 1 hr, the latex was cooled to room temperature, filtered through a 100 and 325 mesh screens and equilibrated overnight. It was then assessed for colloidal stability and phase separation of the epoxy. As shown in Table 3, the sample was stable to separation and was heat-age stable, even with relatively high amounts of MAA.

Example 3

The acrylic epoxy dispersion of Example 3 contains the noted charged amounts: 85 wt % of the acrylic latex of Example 1, and 15 wt % of Bisphenol A diglycidyl ether (BADGE) liquid epoxy, DER 331™. It was prepared in the same manner as Example 1 except using the following charged amounts: Example 1 (1041.73 g), D.E.R.™ 331 Liquid Epoxy Resin (96.0 g), TRITON™ X-405 (27.58 g), Deionized water (108.87 g). As shown in Table 3, the sample was stable to separation and was heat-age stable, even with relatively high amounts of MAA. This therefore confirms that the use of anti-agglomerating components in the polymer can enable improved stability for compositions containing higher level of epoxy.

TABLE 3

Acrylic-Epoxy Latex Properties

| | Example 1 | Example 2 | Example 3 |
|---|---|---|---|
| Acrylic (Intermediate A) | 100 | 70 | 85 |
| D.E.R. 331 ™ Liquid Epoxy Resin | 0 | 30 | 15 |
| Particle Size, nm (Pre-DER 331 ™ Liquid Epoxy Resin) | 244.6 | 244.6 | 244.6 |
| Particle Size, nm (After DER 331 ™ Liquid Epoxy Resin) | n/a | | 254.4 |
| Viscosity, cps | 33.5 | 43.5 | 39 |
| pH | 5.24 | 5.32 | 5.22 |
| % Solids (Theoretical) | 50.7 | 50.5 | 50.5 |
| % Solids (Measured) | 50.7 | 49.6 | 50.3 |
| Heat Age Stable (10 days @ 60 C.) | Yes | Yes | Yes |

2.2 Analytical Method

The viscosity of each of the latex polymers was measured in centipoise (cP) using a Brookfield DV-II+ Pro viscometer. Qualitative visual assessment of final aqueous composition was also made using the following ratings:

Excellent—No observable change in viscosity
Good—Slight change in viscosity
Fair—Significant change in viscosity
Poor—Gelled Heat-age stability testing was determined by placing aliquots of the latex samples contained in 4 oz glass jars in 60° C. oven for 10 days. After 10 days, the samples were assessed for colloidal stability and particle size measurements. Samples were determined to be heat-age stable if their particle size did not change by 30 nm from their initial particles size prior to the heat-age stability testing. A Mettler HR73 Halogen Moisture Analyzer was used to determine the percent (%) solids of the samples. The Halogen Moisture Analyzer is pre-heated to 50° C. to minimize possible temperature effects. The method involves weighing a sample onto a fiberglass pad in an aluminum pan, then heating it to drive off volatiles. The percent total solids is calculated by the Halogen Moisture Analyzer. Particle size was determined using a Brookhaven Instruments BI-90 Particle Size Analyzer.

2.3 Floor Polish Test Methods

The method for applying the coating compositions is described in Annual Book of ASTM Standards, Section 15, Volume 15.04, test procedure ASTM D 3153, except that 0.014 mL per square inch of substrate (0.0022 mL/cm$^2$) was applied to the substrates. The standard bench applicator used was a gauze pad. The floor polishes were coated onto 12 inch by 12 inch (30.5×30.5 cm) black vinyl composition floor tiles[Armstrong Excelon® Vinyl Composition Tile, Pattern 56790, supplied by Armstrong World Industries, Inc., Lancaster, Pa., U.S.A.]. Each coat was allowed to dry for approximately 30 to 60 minutes between coats. All tests were performed on the Armstrong Excelon® Vinyl Composition Tile substrates.

Gloss and Recoat Gloss: The method for determining the gloss performance and recoat gloss performance of polish formulations is described in Annual Book of ASTM Standards, Section 15, Volume 15.04, test procedure ASTM D 1455. Gloss determined on black vinyl composition tile. Gloss measurements were made with a MICRO TRI GLOSS™ gloss meter (BYK, Columbia, Md., USA).

Pencil hardness: Pencil hardness was determined using test method ASTM D3363-05 with the same panels as for the gloss measurement but after 2 weeks of curing/drying at ambient temperature and 50% relative humidity.

Removability: The method for determining polish removability is described in Annual Book of ASTM Standards, Section 15, Volume 15.04, test procedure ASTM D 1792, except ¼ or ½ dilution of Freedom (Diversey Inc. Sturtevant, Wis. 53177 USA) in water was used as the test stripping solution. An Abrasion Tester apparatus (Model No. AG-8100 from Pacific Scientific, Gardner/Neotec Instrument Division, Silver Spring, Md., U.S.A.) was used in determing film removability. In the various removability tests the number of cycles was varied between 75 to 300. The removability test was was performed with a nylon bristle brush (PB-8112 brush from BYK Additives & Instruments, Columbia, Md., U.S.A.) weighted with a 1 pound (0.45 kg) weight.

Tack-Free Time Test Method: This test is performed on tiles coated in a constant temperature and humidity room (22° C. at 50% relative humidity). The surface coatings tack-free time is determined using the Zapon tack tester. The tack tester was fabricated out of a 1-inch (2.54 cm) wide bent piece of aluminum sheet metal that is $\frac{1}{16}^{th}$ of an inch (1.6 mm) thick. It is sized so that a 1 inch square (2.54×2.54 cm) section will rest flatly on the surface. It is weighted so that when a five gram weight is placed on the center of the aluminum strip it will stand upright. If a weight less than five grams is placed on the center of the aluminum strip it will fall over. The tack tester is placed on the surface of the film with a 500-gram weight placed on the tester. The weight is kept on the tester for five seconds then removed. If the tester falls over within five seconds the coating passes the Zapontack free test. The time that has elapsed from when the coating was applied is recorded as the Zapon tack free time.

Examples 4-7

Preparation of 2-Component Floor Polish Formulations

The acrylic epoxy compositions of Examples 1-3 were used to prepare the aqueous coating compositions of Examples 4-7. Standard glassware and standard procedures were used to prepare the floor polishes. The floor polish formulations were then coated on vinyl composite tiles and evaluated. The floor polishes were prepared under ambient conditions. The polishes were prepared by charging the raw materials, for Part A, to the glassware with agitation first. In some examples, portions of a zinc ammonium bicarbonate (ZnABC)—polyvalent metal ion-stock solution were added to Part A to provide fast cure and initial durability. Part A was stirred for 30 minutes. Part B raw materials were then charged to Part A with agitation in the order listed in the corresponding Table 4. Amounts in parentheses in Table 4 are solids contents. Examples 6 and 7 are actual examples and Examples 4 and 5 are comparative.

Zinc ammonium bicarbonate (ZnABC)—polyvalent metal ion stock solution

| Raw Material Order of Addition | Wt % |
|---|---|
| ZnO | 50.3 |
| NH$_4$HCO$_3$ | 62.7 |
| NH$_4$OH (28%) | 83.4 |
| H$_2$O | 285.0 |

As shown in Table 6, the 2-component floor polish formulation of Example 5 containing higher levels of the epoxy but no additional metal crosslinker became unstable upon combination with the amine hardener part B. The viscosity of Example 5 increased significantly within 2 hours of the amine hardener addition and gelled after 2 hours. The formulation thus exhibited poor working pot life. Furthermore, the coating based on Example 5 resulted in increased durability in terms of increased pencil hardness but was not removable. The coating of Example 5 is therefore not useful for floor polish applications requiring multiple coating and drying steps, and more importantly, where removability is required. In contrast, Example 6 which contained 30 wt % of the epoxy as well as a additional metal crosslinker was stable for the duration of the multiple coating steps. The coating of Example 6 exhibited fast drying times, exhibited a higher pencil hardness and was removable. The results therefore confirms that floor polish compositions with improved durability can be achieved by a two-component polymer composition based on stable acrylic thermoplastic latex polymer imbibed with an epoxy crosslinked with a combination of polyvalent metal ions and a polyfunctional crosslinker such as a polyamine. The use of a combination of curing mechanism provided short tack-free times comparable to conventional zinc-based floor but with improved durability without compromising removability.

TABLE 4

Floor Polish Formulations

| | Example Number | | | |
|---|---|---|---|---|
| | Ex. 4 | Ex. 5 | Ex. 6 | Ex. 7 |
| Polymer ID: | Ex. 1 | Ex. 2 | Ex. 2 | Ex. 3 |
| Acrylic/Epoxy Ratio | 100/0 | 70/30 | 70/30 | 85/15 |
| Polyvalent metal ion | Yes | No | Yes | Yes |
| Polyfunctional curing agent | No | Yes | Yes | Yes |
| Part A (acrylic/epoxy) | | | | |
| Raw Material Order of Addition, Stir and maintain a vortex throughout addition process | Parts | Parts | Parts | Parts |
| Water | 34.50 | 34.30 | 34.30 | 35.50 |
| CAPSTONE ™ FS-65 (1%) | 0.68 | 0.68 | 0.68 | 0.68 |
| Add following items as a Premix: | | | | |
| RHOPLEX ™ E-1531C (38%) | 3.32 | 3.32 | 3.32 | 3.32 |
| Water | 1.72 | 1.72 | 1.72 | 1.72 |
| TRITON ™ X405 (70%) | 0.15 | 0.15 | 0.15 | 0.15 |
| Then add to entire mixture | | | | |
| Diethylene Glycol Ethyl Ether | 3.00 | 3.00 | 3.00 | 2.00 |
| Dipropylene Glycol Methyl Ether | 2.00 | 2.00 | 2.00 | 2.00 |
| Tributoxy Ethyl Phosphate | 1.70 | 1.00 | 1.00 | 1.80 |
| Ex. 1 (50.7%) | 20.00 | 0.00 | 0.00 | 0.00 |

TABLE 4-continued

Floor Polish Formulations

| | Example Number | | | |
|---|---|---|---|---|
| | Ex. 4 | Ex. 5 | Ex. 6 | Ex. 7 |
| Ex. 2 (49.6%) | 0.00 | 20.00 | 20.00 | 0.00 |
| Ex. 3 (50.3%) | 0.00 | 0.00 | 0.00 | 20.00 |
| Michem ® Emulsion 93235 (35%) | 3.60 | 3.60 | 3.60 | 3.60 |
| ZnABC solution | 1.40 | 0.00 | 1.40 | 1.40 |
| Part B (epoxy hardener) | | | | |
| D.E.H. ™ 804 Epoxy Curing Agent (20%) | 0.00 | 13.78 | 13.76 | 6.99 |
| TRITON ™ X405 (70%) | 0.82 | 0.00 | 0.00 | 0.41 |

TABLE 5

Raw Material Function and Supplier Information

| Raw Material | Function | Supplier |
|---|---|---|
| Capstone ™ FS-65 | Fluorosurfactant wetting agent | Dupont Chemicals and Fluoroproducts, Wilmington, Delaware, U.S.A. |
| TRITON ™ X-405 | Surfactant | The Dow Chemical Company, Midland, Michigan, U.S.A |
| RHOPLEX ™ E-1531C Emulsion | Alkali-Soluble-Resin | The Dow Chemical Company, Midland, Michigan, U.S.A |
| Michem ® Emulsion 93235 | Nonionic Polyethylene Emulsion | Michelman, Cincinnati, Ohio, U.S.A. |
| D.E.H. ™ 804 Epoxy Curing Agent | Polyfunctional Curing Agent | The Dow Chemical Company, Midland, Michigan, U.S.A |

TABLE 6

Floor Polish Results

| | Ex. No. | | | |
|---|---|---|---|---|
| | Ex. 4 | Ex. 5 | Ex. 6 | Ex. 7 |
| Polymer ID: | Ex. 1 | Ex. 2 | Ex. 2 | Ex. 3 |
| Acrylic/Epoxy Ratio | 100/0 | 70/30 | 70/30 | 85/15 |
| Polyvalent metal ion | Yes | No | Yes | Yes |
| Polyfunctional curing agent | No | Yes | Yes | Yes |
| Useable Potlife | unlimited | <2 hr. | ~1 day | ~1 day |
| Qualitative viscosity assessment @ 2 hr. | Excellent | Fair | Excellent | Excellent |
| Qualitative viscosity assessment @ 24 hr | Excellent | Poor | Excellent | Excellent |
| 20° Gloss: | | | | |
| First Coat | 4 | 2 | 5 | 4 |
| Second Coat | 10 | 1.9 | 9 | 8 |
| Third Coat | 14 | 1.9 | 12 | 8 |
| Next day | 12 | 2.3 | 11 | 8 |
| First Coat | 23 | 14.4 | 24 | 21 |
| Second Coat | 39 | 15.4. | 35 | 35 |
| Third Coat | 48 | 15.9 | 42 | 39 |
| Next day | 43 | 18.2 | 40 | 37 |
| Tack Time (min): | | | | |
| First Coat | 18 | 40 | 19 | 20 |
| Second Coat | 19 | 28 | 20 | 19 |
| Hardness | | | | |
| 48 Hr. | 2H | 3H | 3H | F |
| 7 Days at 20° C. | 2H | 3H | 3H | 2H |

TABLE 6-continued

Floor Polish Results

| | Ex. No. | | | |
|---|---|---|---|---|
| | Ex. 4 | Ex. 5 | Ex. 6 | Ex. 7 |
| Removability | | | | |
| 48 Hr., room temp, 75 cycles | Excellent | Poor | Good | Excellent |
| 7 Days@20° C., 300 cycles | Excellent | Poor | Good | Excellent |

The invention claimed is:

1. An aqueous composition comprising: (a) an aromatic-acrylic polymer comprising from 3 to 11 wt % polymerized units of $C_3$-$C_6$ carboxylic acid monomers and from 0.2 to 3 wt % polymerized units of anti-agglomerating monomers; (b) a reactive polyfunctional thermosetting resin; (c) a polyvalent metal ion; and (d) a polyfunctional curing agent, wherein the anti-agglomerating monomers are selected from the group consisting of phosphoethyl methacrylate, sodium styrene sulfonate, acetoacetoxyethyl methacrylate and acrylamidomethyl-propane sulfonate, and wherein the curing agent is stored separately from the thermosetting resin.

2. The composition of claim 1 in which the reactive polyfunctional thermosetting resin is an epoxy resin.

3. The composition of claim 2 comprising from 5 to 15 wt % of said aromatic-acrylic polymer and from 1 to 7 wt % of said epoxy resin, percentages calculated from solids weight of polymer or resin and from entire weight of the composition.

4. The composition of claim 3 in which the polyvalent metal ion is zinc.

5. The composition of claim 4 in which the aromatic-acrylic polymer further comprises from 40 to 95 wt % polymerized $C_1$-$C_8$ alkyl (meth)acrylate monomer units.

6. A method for coating a substrate; said method comprising applying an aqueous composition formed by combining ingredients comprising: (a) an aromatic-acrylic polymer comprising from 3 to 11 wt % polymerized units of $C_3$-$C_6$ carboxylic acid monomers and from 0.2 to 3 wt % polymerized units of anti-agglomerating monomers; (b) a reactive polyfunctional thermosetting resin; (c) a polyvalent metal ion; and (d) a polyfunctional curing agent, wherein the anti-agglomerating monomers are selected from the group consisting of phosphoethyl methacrylate, sodium styrene sulfonate, acetoacetoxyethyl methacrylate and acrylamidomethyl-propane sulfonate.

7. The method of claim 6 in which the reactive polyfunctional thermosetting resin is an epoxy resin.

8. The method of claim 7 in which said aqueous composition comprises from 5 to 15 wt % of said aromatic-acrylic polymer and from 1 to 7 wt % of said epoxy resin, percentages calculated from solids weight of polymer or resin and from entire weight of the composition.

9. The method of claim 8 in which the polyvalent metal ion is zinc.

10. The method of claim 9 in which the aromatic-acrylic polymer further comprises from 40 to 95 wt % polymerized $C_1$-$C_8$ alkyl (meth)acrylate monomer units.

11. The composition of claim 5 in which the anti-agglomerating monomer is phosphoethyl methacrylate.

12. The method of claim 10 in which the anti-agglomerating monomer is phosphoethyl methacrylate.

* * * * *